(12) United States Patent
Southgate

(10) Patent No.: US 6,311,309 B1
(45) Date of Patent: *Oct. 30, 2001

(54) METHODS AND APPARATUS FOR SIMULATING A PORTION OF A CIRCUIT DESIGN

(75) Inventor: Timothy J. Southgate, Redwood City, CA (US)

(73) Assignee: Altera Corporation, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,777

(22) Filed: Oct. 27, 1997

Related U.S. Application Data

(60) Provisional application No. 60/029,277, filed on Oct. 28, 1996.

(51) Int. Cl.$^7$ ................................................ G06F 17/50
(52) U.S. Cl. ........................ 716/1; 703/13; 703/14; 703/15
(58) Field of Search .................... 395/500.35, 500.34, 395/500.36, 500.04; 716/1, 3; 703/13, 14, 15

(56) References Cited

U.S. PATENT DOCUMENTS

| | | |
|---|---|---|
| 4,768,087 | 8/1988 | Taub et al. ............................ 348/3 |
| 4,916,738 | 4/1990 | Chandra et al. ..................... 713/159 |
| 5,008,814 | 4/1991 | Mathur ................................ 709/221 |
| 5,050,091 | 9/1991 | Rubin ................................... 716/10 |
| 5,111,413 | * 5/1992 | Lazansky et al. ..................... 703/14 |
| 5,155,836 | 10/1992 | Jordan et al. ......................... 703/23 |
| 5,155,837 | 10/1992 | Liu et al. ............................ 709/221 |
| 5,206,939 | 4/1993 | Yanai et al. ............................ 711/4 |

(List continued on next page.)

FOREIGN PATENT DOCUMENTS

| | | | |
|---|---|---|---|
| 0703531A1 | 3/1996 | (EP) | ................................ G06F/9/44 |
| 92/09160 A1 | 5/1992 | (WO) | ................................ H04L/9/00 |
| 96/32679 | 10/1996 | (WO) | ................................ G06F/13/00 |
| 97/48044 | 12/1997 | (WO) | ................................ G06F/9/445 |

OTHER PUBLICATIONS

Riley et al., "An Instance of the Application Download Pattern: The SPAIDS Software Loader/ Verifier Domain Analysis and Implementation," ACM 1997, pp. 273–278.

(List continued on next page.)

*Primary Examiner*—Matthew Smith
*Assistant Examiner*—Vuthe Siek
(74) *Attorney, Agent, or Firm*—Beyer Weaver & Thom LLP

(57) ABSTRACT

A method for simulating a portion of a circuit design is described. The circuit design includes a plurality of design files each corresponding to one of a plurality of design entities in the circuit design. A subset of the design entities is selected. The subset of the design entities corresponds to the portion of the circuit design to be simulated. In response to selection of the subset of the design entities, a netlist is generated under software control directly from the design files associated with the subset of the design entities. The portion of the circuit design is then simulated using the netlist.

34 Claims, 7 Drawing Sheets

U.S. PATENT DOCUMENTS

| | | | |
|---|---|---|---|
| 5,220,512 | | 6/1993 | Watkins et al. ............... 716/11 |
| 5,278,769 | | 1/1994 | Bair et al. ............... 703/19 |
| 5,301,318 | * | 4/1994 | Mittal ............... 717/1 |
| 5,335,320 | * | 8/1994 | Iwata et al. ............... 716/4 |
| 5,367,468 | | 11/1994 | Fukusawa et al. ............... 716/11 |
| 5,418,728 | | 5/1995 | Yada ............... 700/97 |
| 5,422,833 | | 6/1995 | Kelem et al. ............... 703/14 |
| 5,423,023 | | 6/1995 | Batch et al. ............... 717/1 |
| 5,436,849 | | 7/1995 | Drumm ............... 716/18 |
| 5,442,790 | * | 8/1995 | Nosenchuck ............... 717/7 |
| 5,463,563 | | 10/1995 | Bair et al. ............... 716/11 |
| 5,499,192 | | 3/1996 | Knapp et al. ............... 716/17 |
| 5,513,124 | | 4/1996 | Trimberger et al. ............... 716/7 |
| 5,524,253 | | 6/1996 | Pham et al. ............... 709/202 |
| 5,526,517 | | 6/1996 | Jones et al. ............... 707/8 |
| 5,541,849 | * | 7/1996 | Rostoker et al. ............... 716/18 |
| 5,572,436 | | 11/1996 | Dangelo et al. ............... 716/18 |
| 5,572,437 | | 11/1996 | Rostoker et al. ............... 716/18 |
| 5,574,655 | | 11/1996 | Knapp et al. ............... 716/17 |
| 5,594,657 | | 1/1997 | Cantone et al. ............... 716/16 |
| 5,623,418 | | 4/1997 | Rostoker et al. ............... 716/1 |
| 5,625,565 | | 4/1997 | Van Dyke ............... 716/1 |
| 5,661,660 | | 8/1997 | Freidin ............... 716/1 |
| 5,673,198 | | 9/1997 | Lawman et al. ............... 716/11 |
| 5,691,912 | | 11/1997 | Duncan ............... 716/11 |
| 5,696,454 | | 12/1997 | Trimberger ............... 326/38 |
| 5,715,387 | | 2/1998 | Barnstijn et al. ............... 714/38 |
| 5,721,912 | * | 2/1998 | Stepczyk et al. ............... 707/102 |
| 5,737,234 | | 4/1998 | Seidel et al. ............... 716/1 |
| 5,745,748 | | 4/1998 | Ahmad et al. ............... 707/10 |
| 5,761,079 | | 6/1998 | Drumm ............... 716/11 |
| 5,790,416 | | 8/1998 | Norton et al. ............... 716/11 |
| 5,801,958 | | 9/1998 | Dangelo et al. ............... 716/18 |
| 5,805,861 | | 9/1998 | Gilbert et al. ............... 703/15 |
| 5,809,145 | | 9/1998 | Slik et al. ............... 705/52 |
| 5,812,847 | * | 9/1998 | Joshi et al. ............... 709/329 |
| 5,819,072 | * | 10/1998 | Bushard et al. ............... 716/10 |
| 5,848,263 | | 12/1998 | Oshikiri ............... 716/3 |
| 5,850,348 | | 12/1998 | Berman ............... 716/6 |
| 5,867,691 | | 2/1999 | Shiraishi ............... 713/400 |
| 5,870,308 | * | 2/1999 | Dangelo et al. ............... 716/18 |
| 5,878,225 | | 3/1999 | Bilansky et al. ............... 709/227 |
| 5,896,521 | * | 4/1999 | Shackleford et al. ............... 703/21 |
| 5,901,066 | | 5/1999 | Hong ............... 716/8 |
| 5,903,475 | * | 5/1999 | Gupte et al. ............... 703/16 |
| 5,909,545 | | 6/1999 | Frese, II et al. ............... 709/208 |
| 5,983,277 | | 11/1999 | Heile et al. ............... 709/232 |

OTHER PUBLICATIONS

Spang, III et al., "The BEACON block–diagram environment," World Congress of the International Federation of Automatic Control, vol. 2, Robust Control, Design and Software, Jul. 18, 1993, pp. 749–754.

Rimvall et al., "An Open Architecture for Automatic Code Generation Using the BEACON CACE Environment," Proceedings of IEEE/IFAC Joint Symposium on Computer–Aided Control System Design, Mar. 7, 1994, pp. 315–320.

Girardi et al., "A Register Transfer Level Schematic Editor and Simulator Interface," CSELT Technical Reports, vol. 13, No. 6, Nov. 1985, pp. 403–409.

Heinkel and Glauert, "An Approach for a Dynamic Generation/Validation System for the Functional Simulation Considering Timing Constraints," Proceedings of IEEE/Institute for Computer—Aided Circuit Design, Mar. 11, 1996, pp. 302–306.

Summit Design Inc., "Visual HDL for Verilog Short Course," Sep. 19, 1996, pp. 1–167, *IEEE*.

Bershad, et al., "Lightweight Remote Procedure Call," *ACM Transactions on Computer Systems*, 8:1, pp. 37–55 (1990).

Ganguly, et al., "HSIM1 and HSIM2: Object Oriented Algorithms for VHDL Simulation," *Proceedings of the Seventh Intl. Conf. on VLSI Design*, pp. 175–178 (1994).

Gavish, et al., "Dynamic File Migration in Distributed Computer Systems," *Communications of the ACM*, 33:2, pp. 177–189 (1990).

Iftode, et al., "Shared Virtual Memory with Automatic Update Support," *ICS ACM*, pp. 175–183 (1999).

Keleher, "Tapeworm: High–Level Abstractions of Shared Accesses," *USENIX Association OSDI*, pp. 201–214 (1999).

Maurer, "Efficient Simulation for Hierarchical and Partitioned Circuits," *Proceedings of the Twelfth Intl. Conf. on VLSI Design*, pp. 236–241 (1999).

* cited by examiner

METHODS AND APPARATUS FOR SIMULATING A PORTION OF A CIRCUIT DESIGN

RELATED APPLICATION DATA

The present application claims priority from U.S. Provisional Application Ser. No. 60/029,277 entitled TOOLS FOR DESIGNING PROGRAMMABLE LOGIC DEVICES filed on Oct. 28, 1996, the entire specification of which is incorporated herein by reference.

This invention is related to U.S. patent application Ser. No. 08/958,002 filed on Oct. 27, 1997, naming B. Pedersen et al. as inventors, and entitled "GENERATION OF SUBNET LISTS FOR USE IN INCREMENTAL COMPILATION." That application is incorporated herein by reference in its entirety and for all purposes.

This invention is also related to U.S. patent application Ser. No. 08/958,436, filed on Oct. 27, 1997, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on Oct. 27, 1997, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related U.S. patent application Ser. No. 08/958,626, filed on Oct. 27, 1997, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Ser. No. 08/958,778, filed on Oct. 27, 1997, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on Oct. 27, 1997, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on Oct. 27, 1997, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on Oct. 27, 1997, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on Oct. 27, 1997, naming T. Southgate as inventor, and entitled "METHOD FOR SIMULATING A CIRCUIT DESIGN." That application is incorporated herein by reference in its entirety and for all purposes.

This invention is also related to U.S. patent application Ser. No. 08/957,957, filed on Oct. 27, 1997, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, filed on Oct. 27, 1997, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on Oct. 27, 1997, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on Oct. 27, 1997, naming F. Heile as inventor, and entitled "ELECTRONIC DESIGN AUTOMATION TOOL FOR DISPLAY OF DESIGN PROFILE." That application is incorporated herein by reference in its entirety.

BACKGROUND OF THE INVENTION

The present invention relates to software-controlled simulation of a circuit design. More specifically, the present invention provides a method for simulating a circuit design using a block diagram representation of the design in a graphical user interface.

Despite the great variety of software circuit design tools currently available, most circuit designers continue to generate their high level designs using pencil and paper. That is, the designer typically draws by hand in a notebook one or more high level block diagrams which may represent increasingly detailed levels of the circuit design. The current practice is to then take these block diagrams and manually convert them to one or more design files in some design file format, e.g., VHDL or Verilog. The circuit level implementations of the blocks in the block diagrams are then specified in these design files. Tedious manual conversions of this type are typically performed exclusively by one or more full time programmers.

There are computer aided drawing (CAD) tools with which a designer can create high level block diagrams in a graphical user interface. However, such CAD tools do not interface with the design tools used for defining the circuit level implementation of the individual blocks in the diagram. Even with an electronically created block diagram, unrelated design files must be created for the implementation of the individual blocks of the diagram. That is, a block diagram created with a currently available CAD tool is about as useful as a hand drawn block diagram with regard to the circuit level implementation of a design.

Once such design files are fully specified the functional operation of each may be individually simulated by a variety of well known techniques. That is, the operation of a design file written in VHDL may be simulated by the application of VHDL test vectors using a VHDL test bench. If, however, the designer wishes to simulate the operation of some combination of blocks in a high level diagram, an entirely new design file must be constructed which specifies all of the included blocks and their combined external interface. That is, there is currently no way in which the separate design files may be easily combined and simulated. The disadvantages of the current approach are manifest. With the addition of each new simulation design file, the file maintenance function associated with a particular design becomes increasingly complex. That is, the number of design files which must be updated when a change is made to one of the related files increases as the number of combination design files increases. And, as mentioned above with respect to the conversion of hand drawn block diagrams to design files, the creation of these simulation design files is highly labor intensive. Moreover, if related design files are not in the same format, as may be the case where a designer wishes to use a previously generated design file from a design entity library, they cannot be combined into a new design file for simulation until one of the files is completely specified in the same format as the other.

It is therefore desirable to provide a method by which different combinations of blocks in a block diagram may be easily combined and simulated together.

SUMMARY OF THE INVENTION

According to the present invention a method is provided by which a circuit designer may select a plurality of design files corresponding to blocks in a block diagram and simulate the combination of the selected blocks without having to create a separate design file. According to a specific embodiment, the designer creates a block diagram in a graphical user interface (GUI) and then generates individual design files representing the blocks in the diagram. The design files may be in any of a variety of graphic or text formats. Once the design files are sufficiently specified, the designer may select individual blocks in the GUI for simulation. A netlist is generated for the block using the information in the design file and a simulation is performed using the netlist. The designer may also select more than one block in the GUI for simulation of the combination of the selected blocks. A netlist is generated for the combination of blocks using the associated design files and an external interface for the combination of blocks is determined based on the design files and the interconnections between the various blocks as specified in the block diagram. A simulation is then performed using the combined netlist.

According to another specific embodiment, the designer generates a circuit design comprising a plurality of design files which may be in any of a variety of text formats. The circuit design is represented by a hierarchy tree in a text-mode user interface (TUI) which relates the design files associated with the circuit design. In the TUI, the designer selects one or more blocks for simulation in response to which a netlist is generated corresponding to the selected design file or files in much the same way as is done with the above-described embodiment. With either of the embodiments of the invention, the designer may perform as many simulations as desired using as many different combinations of blocks and/or design files as desired without having to create additional design files to facilitate the simulation.

Thus, the present invention provides a method for simulating a portion of a circuit design. The circuit design includes a plurality of design files each corresponding to one of a plurality of design entities in the circuit design. A subset of the design entities is selected. The subset of the design entities corresponds to the portion of the circuit design to be simulated. In response to selection of the subset of the design entities, a netlist is generated under software control directly from the design files associated with the subset of the design entities. The portion of the circuit design is then simulated using the netlist.

A further understanding of the nature and advantages of the present invention may be realized by reference to the remaining portions of the specification and the drawings.

DESCRIPTION OF SPECIFIC EMBODIMENTS

Figure 1:
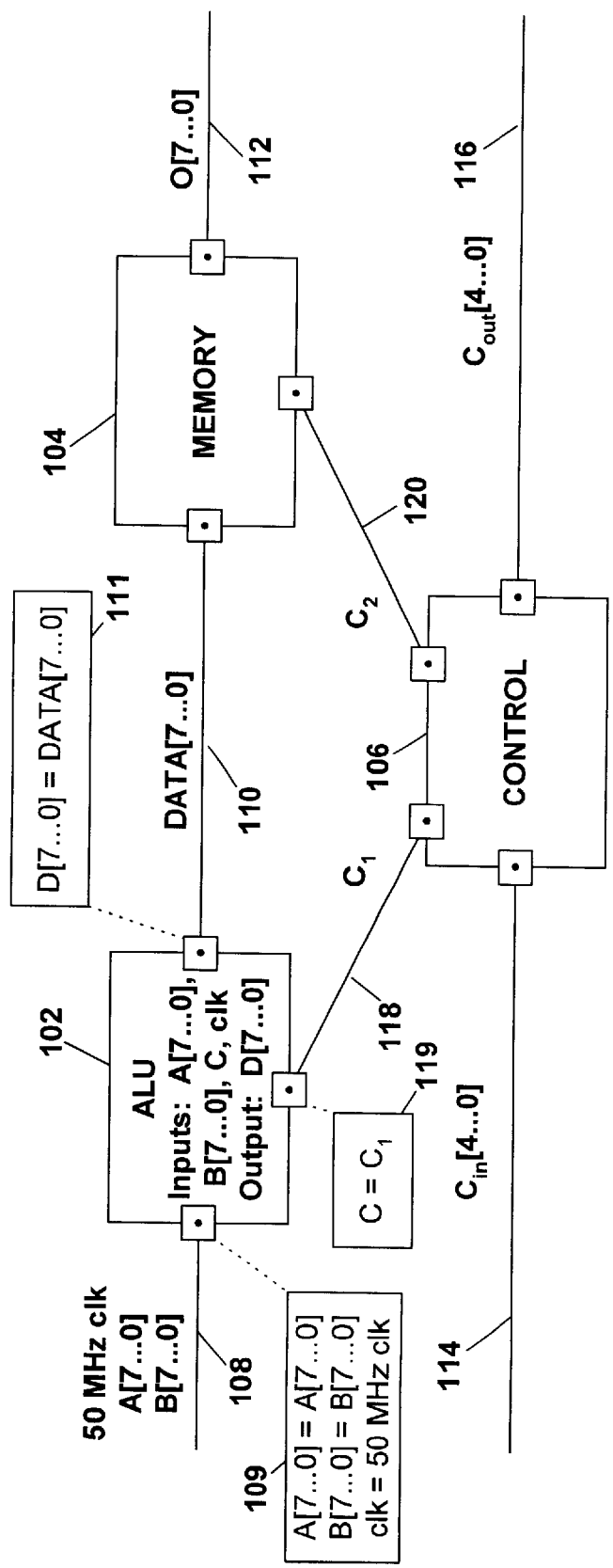
FIG. 1 is a block diagram of a circuit design for illustrating specific embodiments of the invention.

FIG. 1 shows a high level block diagram of a circuit design created using a graphic editor for the purpose of illustrating a specific embodiment of the invention. An example of a graphic editor for use with the present invention is described in commonly assigned, copending U.S. patent application Ser. No. 08/958,434, for GRAPHIC EDITOR FOR BLOCK DIAGRAM LEVEL DESIGN OF CIRCUITS, filed simultaneously herewith, the entire specification of which is incorporated herein by reference. Using standard elements in the graphic editor or his own customized elements, the designer lays out on the screen of his workstation a high level design of his circuit according to the device external specification and the timing requirements. The design shown includes an arithmetic logic unit (ALU) 102, a memory 104, and some kind of control circuitry 106. The designer then interconnects blocks 102, 104 and 106 and specifies external connections to device 100 via a plurality of conduits, each of which represents one or more signals in either direction as required to implement the functionalities desired by the designer. For example, conduit 108 represents input signals A[7 . . . 0] and B[7 . . . 0] and a 50 MHz clock signal. Conduit 110, with the specification DATA[7 . . . 0], represents the data lines between ALU 102 and memory 104. Conduit 112, with the specification O[7 . . . 0], represents the output signal or signals of device 100. Conduits 114 and 116 respectively represent the control inputs and outputs to device 100 as specified by $C_{in}[4 \ldots 0]$ and $C_{out}[4 \ldots 0]$. Finally, conduits 118 and 120 respectively represent control signals $C_1$ and $C_2$ for ALU 102 and memory 104.

The designer then specifies the I/O for each of the blocks. For example, because it is an ALU, block 102 will receive two inputs and, given some control input, provide an output. Thus, the designer might specify inputs A[7 . . . 0] and B[7 . . . 0], control input C, and data output D[7 . . . 0]. A clock input clk would also typically be specified. I/O for memory block 104 and control circuitry 106 (not shown) are similarly specified. The I/O for each block is then mapped to the signal names in the associated conduits. This enables the designer to specify a particular block very generally so that it may be used elsewhere in the design or in other designs. Thus inputs A[7 . . . 0] and B[7 . . . 0] are mapped to identically named signals A[7 . . . 0] and B[7 . . . 0] in conduit 108 while the input clk is mapped to 50 MHz clock in the same conduit (see box 109). Output D[7 . . . 0] is mapped to DATA[7 . . . 0] in conduit 110 (box 111) while input C is mapped to $C_1$ in conduit 118 (box 119). The I/O for blocks 104 and 106 are similarly mapped to the associated conduits (not shown). The fully specified block diagram, i.e., the drawing information, is stored in a graphic design file.

Once the designer has a fully specified high level block diagram he may create more detailed block diagrams or circuit level implementations of each of the blocks in the high level diagram as required by executing a command which instantiates the I/O of a selected block in a new lower level block diagram or in any of several design file formats. That is a variety of design file templates are available in which the block specification of a selected block may be instantiated to generate an incomplete design file in any of several commonly used graphic and text-based formats. For the text formats, the design file templates include much of the complicated syntax which the designer would otherwise need to write. The designer then completes the design file, i.e., implements the block, using the appropriate graphic or text editor. The implementation may be, for example, another block diagram or the circuit level implementation of the block. The use of the design file templates proves to be much less labor intensive than the designer using a text editor and creating design files for each block from scratch. This is especially valuable for the more complex, syntax-heavy design file formats such as VHDL and Verilog. In addition, the designer may customize the design file template to incorporate personal preferences such as formatting and documentation. A more complete discussion of the use of design file templates is provided in commonly assigned, copending U.S. patent application Ser. No. 08/958,432 entitled DESIGN FILE TEMPLATES FOR IMPLEMENTATION OF LOGIC DESIGNS filed simultaneously herewith, the entire specification of which is incorporated herein by reference.

Figure 2A:
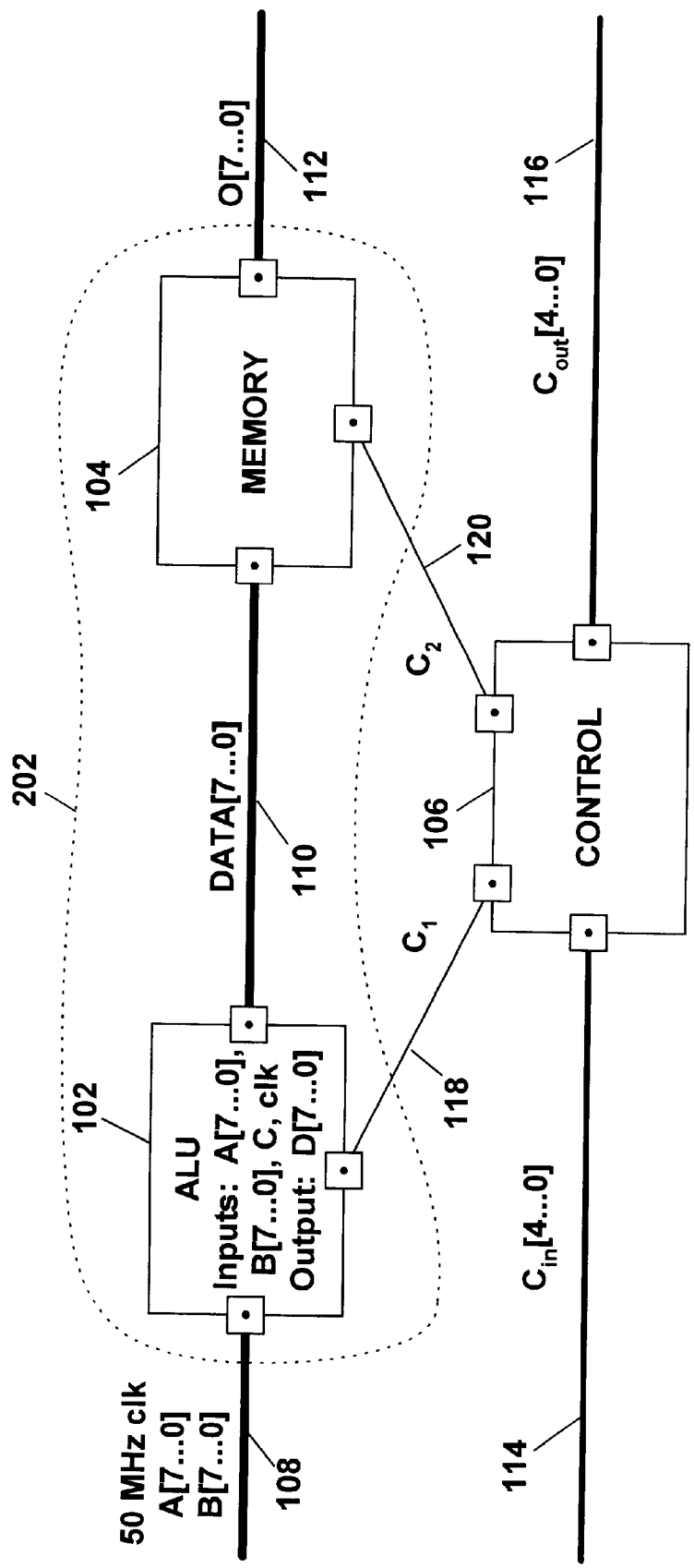
FIGS. 2a and 2b illustrate two specific embodiments of the invention using the block diagram of FIG. 1.

Specific embodiments of the manner in which a portion of a circuit design is selected for simulation according to the invention will now be described with reference to FIGS. 2a and 2b, both of which employ the block diagram of FIG. 1. In FIG. 2a, a selection region 202 is defined by the designer in the GUI to include design entities ALU 102 and memory 104. It will be understood that such a selection region may have a variety of shapes and be generated in a variety of ways. For example, a shape such as the one shown in FIG. 2a may be "drawn" by the designer around the desired region by moving the mouse appropriately. Alternatively, the region could have a rectangular shape which may be expanded or contracted using the mouse according to a well known technique. It should therefore be understood that a wide variety of techniques for defining such a region are within the scope of the invention.

Once the designer has defined the selection region, the enclosed design entities, i.e., blocks, are selected for a partial simulation of the overall design. A netlist is then generated from the fully specified design files corresponding to ALU 102 and memory 104 and the interface information defined in the block diagram, e.g., boxes 109, 111, and 119 of FIG. 1. The external interface of the combined netlist which, in this case, corresponds to the points at which conduits 108, 112, 118 and 120 cross the dotted line, is also determined. One advantage of the present invention is that only the blocks selected for simulation need be fully specified. That is, in this example, control block 106 can be incomplete without affecting the simulation of the combination of blocks 102 and 104. According to a specific embodiment of the invention, regardless of the manner in which the blocks are selected for simulation, blocks which are not fully specified are automatically excluded from the netlist, even where such blocks were included in, for example, a selection region such as region 202.

The netlist which is generated in response to the selection by the designer is annotated such that the simulator employed to simulate the combined blocks can easily identify the external interface where stimuli are to be applied and/or output signals are to be read. The netlist is then simulated by the simulator according to any of a variety of techniques. For example, the netlist may be generated in a format which may be simulated using VHDL test vectors and a VHDL test bench. Alternatively, the netlist may be configured for a Verilog simulation. It will be understood that any of a variety of simulation formats and techniques may be employed without departing from the scope of the invention.

Figure 2B:
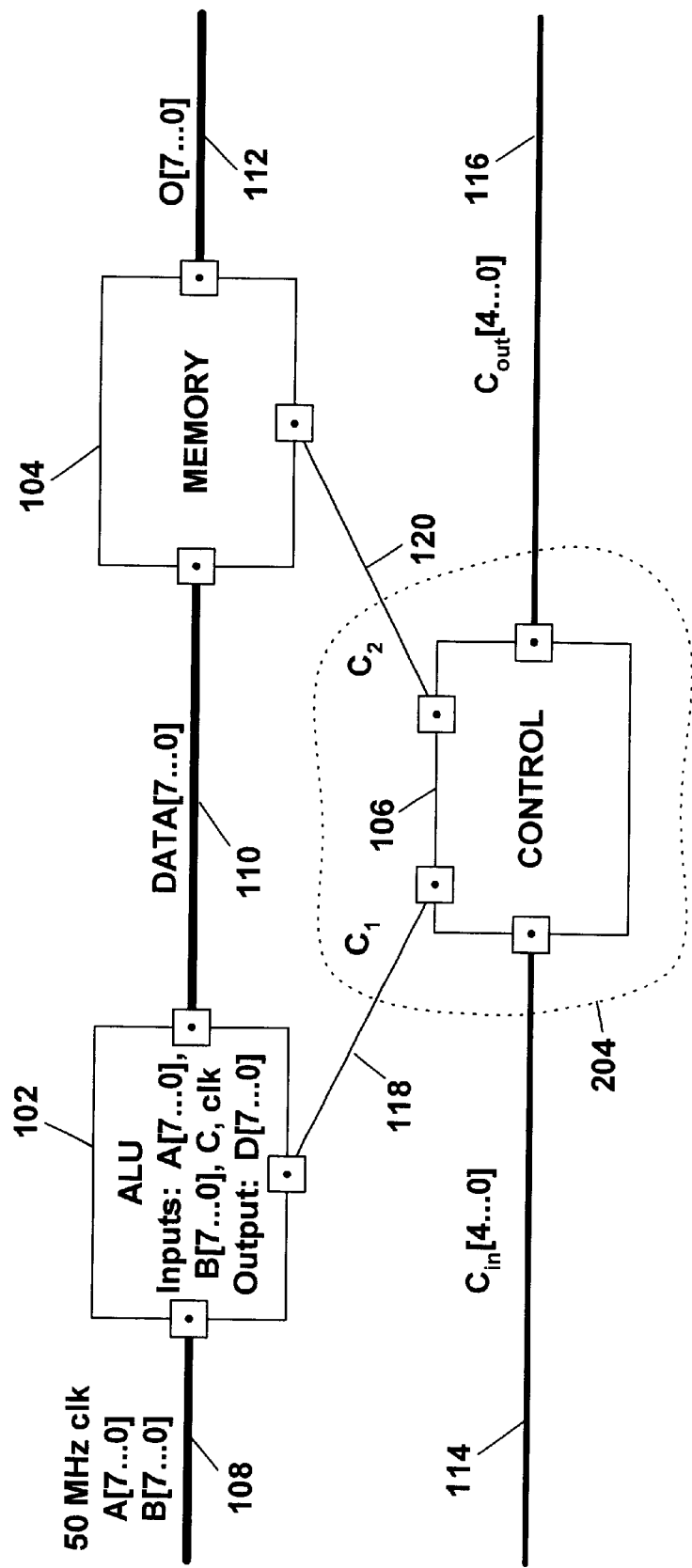

FIG. 2b shows another embodiment by which blocks may be selected for simulation in the GUI. According to this embodiment, the designer defines a region 204 in the GUI enclosing the block (control block 106) to be excluded from the simulation. As discussed above with regard to region 202, region 204 may be generated in a variety of ways. The simulation netlist is generated using the design files corresponding to the blocks outside of region 204 and the appropriate interface information. The netlist is then simulated in the manner described above.

Figure 3:
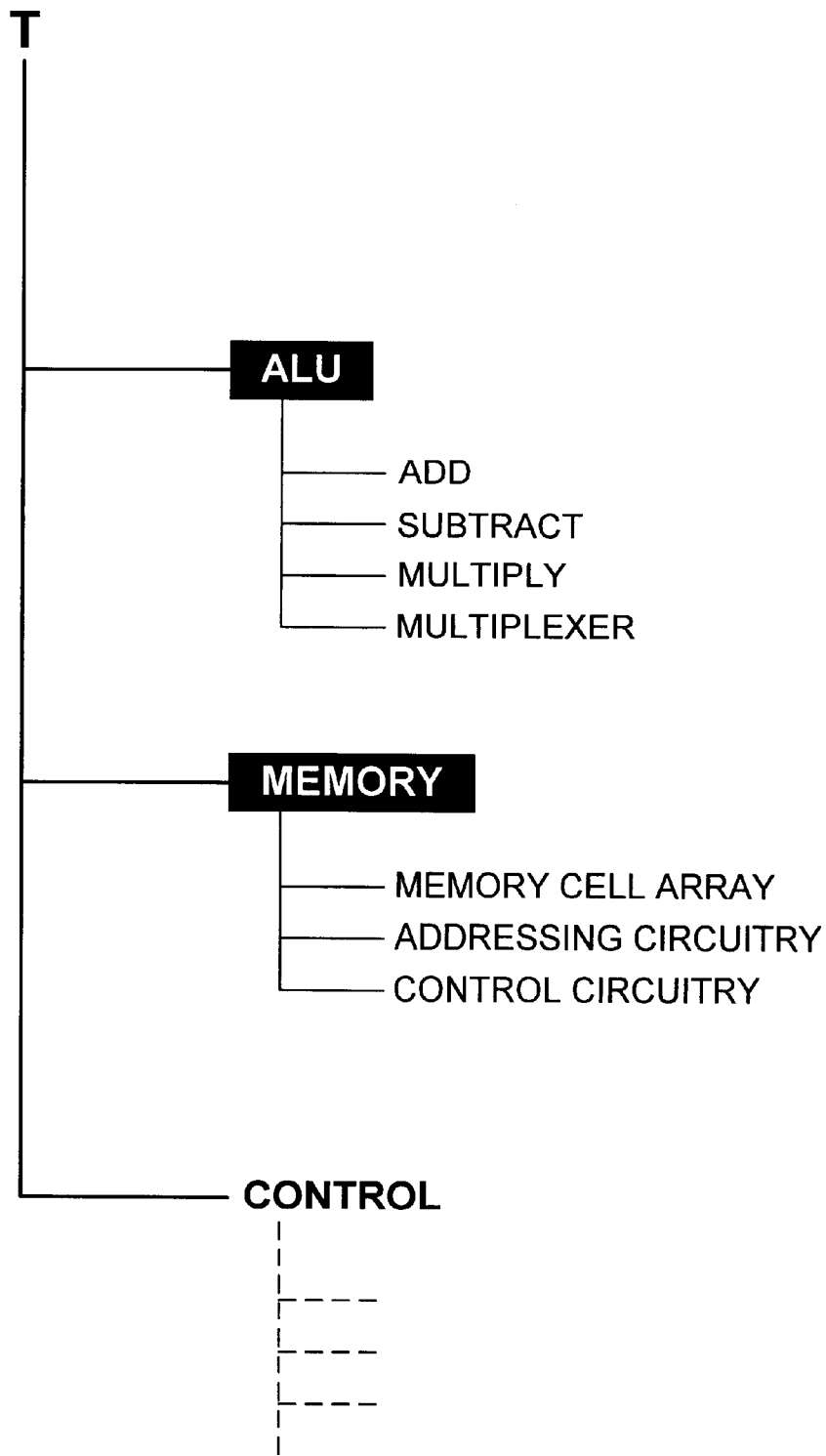
FIG. 3 is a representation of a design hierarchy for illustrating another specific embodiment of the invention.

FIG. 3 an example of a hierarchy tree which corresponds to a circuit design like the one shown in FIG. 1. The tree relates all of the design entities in the circuit design. Such a hierarchy tree would be the designer's interface to an overall design in a text mode interface. Dashed lines emanate from the CONTROL design entity because, in this example, this design entity is not completely specified. According to a specific embodiment of the invention, where the designer's interface with the circuit design is a hierarchy tree (or some equivalent structure), the designer may select a combination of design entities by, for example, highlighting the text representation of the design entities to be either included or excluded from the simulation. As with the embodiments described above with reference to FIGS. 2a and 2b, the design entities may be selected according to a wide variety of techniques without departing from the scope of the invention. In this example, the ALU and MEMORY design entities are selected as represented by the white text on a dark background. The simulation netlist is then generated using the design files corresponding to the selected design entities and the interface information in the design hierarchy file. The netlist is then simulated, as described above, according to any of a variety of techniques.

In view of the embodiments of the invention described above with reference to FIGS. 2a, 2b, and 3, it will be appreciated that the combination of design entities in a circuit design may be selected in a variety of ways without departing from the scope of the invention. It should also be understood that other techniques for selecting these design entities may be employed with various embodiments of the invention. For example, in the GUI of FIGS. 2a and 2b, blocks may be selected simply by clicking on each with the mouse. Such a technique could be employed to both include and exclude blocks from a simulation.

Figure 4:
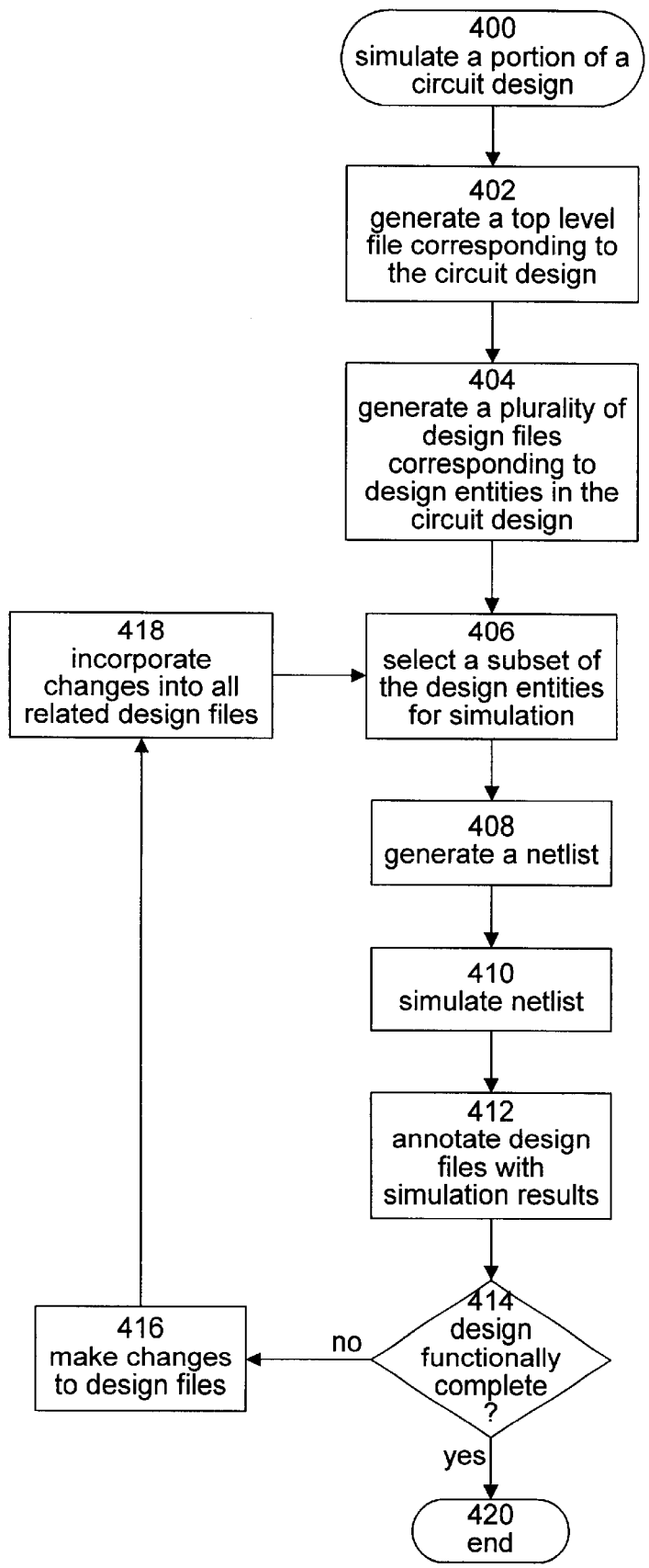
FIG. 4 is a flowchart illustrating the operation of a specific embodiment of the present invention.

FIG. 4 is a flowchart 400 illustrating the operation of a specific embodiment of the invention. Initially, a top level file corresponding to the circuit design is generated (step 402) in any of a variety of ways and formats. For example, as described above, the top level file may be a high level block diagram created in a GUI which specifies the interconnections between design entities, i.e., blocks, in the diagram. Design files specifying the implementations of each of the design entities are then generated in a variety of ways and formats (step 404). That is, the design files may be in any of a variety of graphic and text formats created using a variety of graphic and text editors, and may also be in different formats than other related design files. Some subset of the design entities is then selected for simulation (step 406) as described above with reference to FIGS. 2a, 2b, and 3. A netlist is then generated (step 408) directly from the design files using the interface information specified in the top level file. The netlist is then simulated (step 410) according to any of a variety of well known techniques.

The results of the simulation are then annotated onto the source design files (step 412) to facilitate troubleshooting. If the design is determined not to be functionally complete (step 414) the designer may make changes to the design files (step 416) which are then automatically incorporated into all related design files (step 418) before the revised design is simulated again (step 406). If the design is functionally complete, the process ends. The described embodiment of the invention may be employed as part of a circuit design methodology such as the one described in commonly assigned, copending U.S. patent application Ser. No. 08/958,778 for METHOD AND APPARATUS FOR AUTOMATED CIRCUIT DESIGN, filed herewith, the entire specification of which is incorporated herein by reference.

Figure 5:
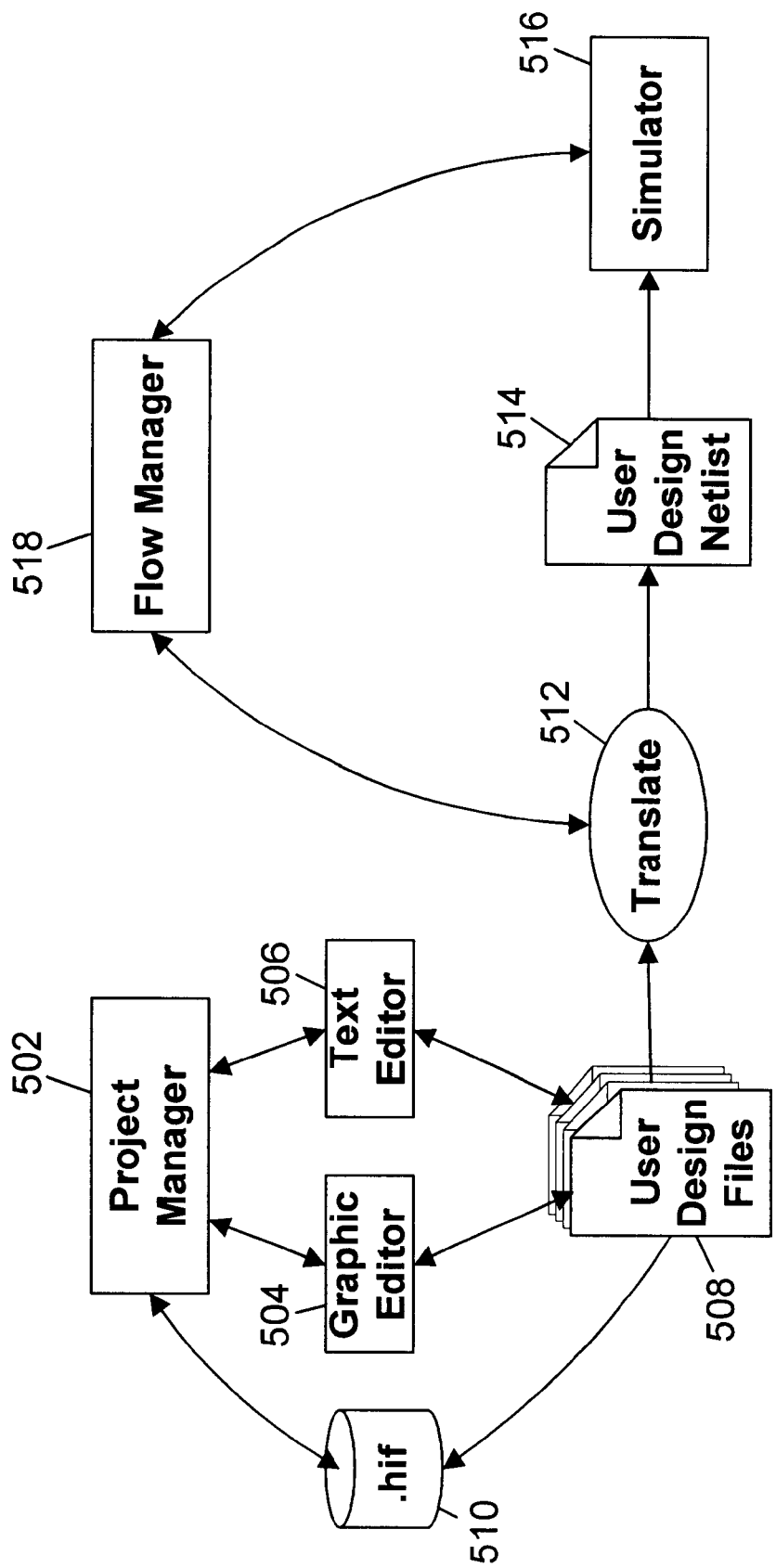
FIG. 5 is an information flow diagram illustrating a specific embodiment of the invention.

FIG. 5 is an information flow diagram illustrating the interaction of the various processes and data according to a specific embodiment of the invention. A project manager 502 interacts with and facilitates the operation of a graphic editor 504 and a text editor 506 which are used by the designer to create design source files 508 which may be in any of a variety of graphic and text formats. Project manager 502 also interacts with hierarchy information database 510 which stores the hierarchy information files for each design. Hierarchy files relate all of the design files associated with a particular design and are used to determine when an update of a design file is necessitated by a change in a related design file.

Once a designer generates one or more design files corresponding to all or part of a circuit design, the files 508 are translated (process 512) from multiple formats into a single format user design netlist 514. A simulator 516 acts on user design netlist 514 to yield functional, behavioral, and/or timing information regarding the portion of the design represented by netlist 514. Translation process 512 and simulator 516 are controlled by a flow manager 518. According to a specific embodiment, this information may appear as annotations on one or more of design files 508 for convenient reviewing by the designer. This is true for either graphic or text design files. Based on the simulation results, the designer may then make changes to one or more of design files 508 and resimulate the design as appropriate until the design operates as intended. The translation of design files 508 to user design netlist 514 is accomplished relatively quickly. Therefore, as is desirable, the time between simulation iterations is very short.

Figure 6:
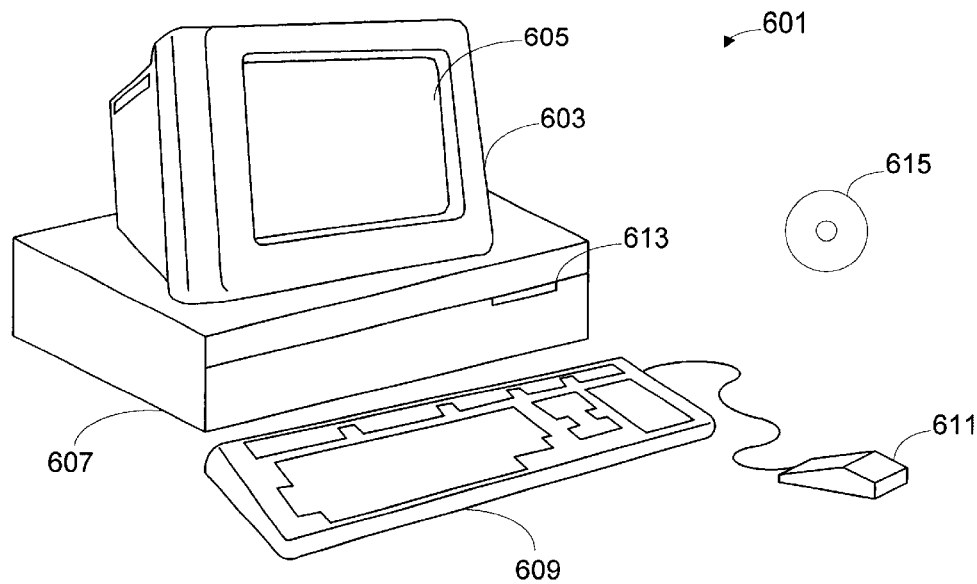
FIG. 6 is an example of a computer system that may be utilized to execute the software of an embodiment of the invention.

FIG. 6 illustrates an example of a computer system that may be used to execute the software of an embodiment of the invention. FIG. 6 shows a computer system 601 which includes a display 603, screen 605, cabinet 607, keyboard 609, and mouse 611. Mouse 611 may have one or more buttons for interacting with a graphical user interface. Cabinet 607 houses a CD-ROM drive 613, system memory and a hard drive (see FIG. 6) which may be utilized to store and retrieve software programs incorporating computer code that implements the invention, data for use with the invention, and the like. Although the CD-ROM 615 is shown as an exemplary computer readable storage medium, other computer readable storage media including floppy disks, tape, flash memory, system memory, and hard drives may be utilized.

Figure 7:
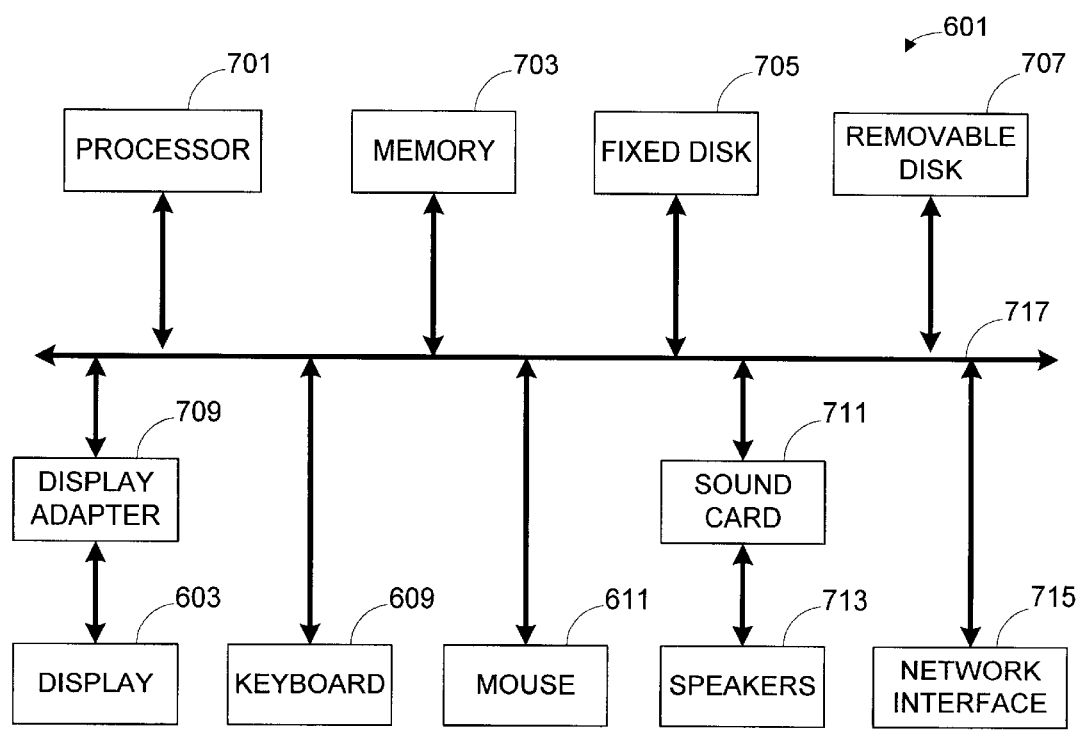
FIG. 7 shows a system block diagram of the computer system of FIG. 6.

FIG. 7 shows a system block diagram of computer system 601 used to execute the software of an embodiment of the invention. As in FIG. 6, computer system 601 includes monitor 603 and keyboard 609, and mouse 611. Computer system 601 further includes subsystems such as a central processor 701, system memory 703, fixed disk 705 (e.g., hard drive), removable disk 707 (e.g., CD-ROM drive), display adapter 709, sound card 711, speakers 713, and network interface 715. Other computer systems suitable for use with the invention may include additional or fewer subsystems. For example, another computer system could include more than one processor 701 (i.e., a multi-processor system), or a cache memory.

The system bus architecture of computer system 601 is represented by arrows 717. However, these arrows are illustrative of any interconnection scheme serving to link the subsystems. For example, a local bus could be utilized to connect the central processor to the system memory and display adapter. Computer system 601 shown in FIG. 7 is but an example of a computer system suitable for use with the invention. Other computer architectures having different configurations of subsystems may also be utilized.

While the invention has been particularly shown and described with reference to specific embodiments thereof, it will be understood by those skilled in the art that changes in the form and details of the disclosed embodiments may be made without departing from the spirit or scope of the invention. For example, the present invention is not restricted to a specific type of circuitry. Rather the present invention may be employed, for example, in the design and simulation of programmable logic devices, gate arrays, discrete circuitry, and a wide variety of integrated circuits. Therefore, the scope of the invention should be determined with reference to the appended claims.

What is claimed is:

1. A method for simulating a portion of a circuit design, the method comprising:

generating a plurality of design files each corresponding to one of a plurality of design entities in circuit design wherein the plurality of design entities includes fully specified design entities which are sufficiently specified to enable generations of netlists for simulation and partially specified design entities which require further specification for generation of netlists for simulation;

selecting a subset of the design entities from among the fully specified and partially specified design entities in the circuit design, the subset of the design entities corresponding to the portion of the circuit design and including at least one of the partially specified design entities;

in response to selecting the subset of the design entities, generating a netlist under software control directly from selected ones of the design files associated with the subset of the design entities, any design file associated with the at least one partially specified design entities being affirmatively excluded from generation of the netlist; and simulating the portion of the circuit design using the generated netlist.

2. The method of claim 1 further comprising presenting a block diagram in a graphical user interface corresponding to the circuit design, the block diagram including a plurality of blocks each corresponding to one of the plurality of design entities, and wherein the subset of the design entities is selected in response to selection in the graphical user interface of blocks associated with the subset of the design entities.

3. The method of claim 2 wherein selection of blocks in the graphical user interface comprises designating a region of the block diagram in the graphical user interface.

4. The method of claim 3 wherein the selected blocks are included within the region.

5. The method of claim 3 wherein the selected blocks are not included within the region.

6. The method of claim 2 wherein selection of the blocks in the graphical user interface comprises designating each block individually.

7. The method of claim 2 wherein the block diagram is generated in response to manipulation of visual objects in the graphical user interface by a user.

8. The method of claim 1 further comprising presenting a hierarchy structure relating the plurality of design files in a text mode user interface, and wherein the subset of the design entities is selected in response to selection in the text mode user interface of symbolic representations associated with the subset of the design entities.

9. The method of claim 8 wherein the design files comprise a text format.

10. The method of claim 1 wherein simulating the portion of the circuit design comprises applying a stimulus to the netlist.

11. The method of claim 10 wherein the stimulus comprises a test vector file and application of the test vector file is done using a corresponding test bench.

12. The method of claim 1 wherein simulating the portion of the circuit design comprises performing a functional simulation using zero delays in the netlist.

13. The method of claim 1 wherein simulating the portion of the circuit design comprises performing a behavioral simulation.

14. The method of claim 1 wherein simulating the portion of the circuit design comprises performing a timing simulation.

15. The method of claim 1 wherein simulating the portion of the circuit design comprises annotating the design files associated with the subset of the design entities with simulation results.

16. The method of claim 1 wherein the design files comprise both graphic and text formats.

17. At least one computer readable medium containing program instructions for simulating a portion of a circuit design, said at least one computer readable medium comprising:

computer readable code for generating a plurality of design files each corresponding to one of a plurality of design entities in the circuit design wherein the plurality of design entities includes fully specified design entities which are sufficiently specified to enable generation of netlists for simulation and partially specified design entities which require further specification for generation of netlists for simulation;

computer readable code for selecting a subset of the design entities from among the fully specified and partially specified design entities in the circuit design, the subset of the design entities corresponding to the portion of the circuit design and including at least one of the partially specified design entities;

computer readable code for, in response to selecting the subset of the design entities, generating a netlist under software control directly from selected ones of the design files associated with the subset of the design entities any design file associated with the at least one partially specified design entities being affirmatively excluded from generation of the netlist; and computer readable code for simulating the portion of the circuit design using the generated netlist.

18. A circuit corresponding to a circuit design, the circuit being designed using a simulation method comprising:

generating a circuit design having a plurality of design files associated therewith, each of the design files corresponding to one of a plurality of design entities in the circuit design wherein the plurality of design entities includes fully specified design entities which are sufficiently specified to enable generation of netlists for simulation and partially specified design entities which require further specification for generation of netlists for simulation;

selecting a subset of the design entities from among the fully specified and partially specified design entities in the circuit design, the subset of the design entities corresponding to a portion of the circuit design and including at least one of the partially specified design entities;

in response to selecting the subset of the design entities, generating a netlist under software control directly from selected ones of the design files associated with the subset of the design entities any design file associated with the at least one partially specified design entities being affirmatively excluded from generation of the netlist; and simulating the portion of the circuit design using the generated netlist.

19. The at least one computer readable medium of claim 17 further comprising computer readable code for presenting a block diagram in a graphical user interface corresponding to the circuit design, the block diagram including a plurality of blocks each corresponding to one of the plurality of design entities, and wherein the computer readable code for presenting the block diagram is operable to select the subset of thee design entities in response to selection in the graphical user interface of blocks associated with the subset of the design entities.

20. The at least one computer readable medium of claim 19 wherein the computer readable code for presenting the block diagram comprises computer readable code for enabling a user to designate a region of the block diagram in the graphical user interface.

21. The at least one computer readable medium of claim 20 wherein the selected blocks are included within the region.

22. The at least one computer readable medium of claim 20 wherein the selected blocks are not included within the region.

23. The at least one computer readable medium of claim 19 wherein the computer readable code for presenting the block diagram comprises computer readable code for enabling a user to designate blocks individually in the graphical user interface.

24. The at least one computer readable medium of claim 19 wherein the computer readable code for presenting the block diagram enables a user to manipulate visual objects in the graphical user interface.

25. The at least one computer readable medium of claim 17 further comprising computer readable code for presenting a hierarchy structure relating the plurality of design files in a text mode user interface, wherein the computer readable code for presenting the hierarchy structure is operable to select the subset of the design entities in response to selection in the text mode user interface of symbolic representations associated with the subset of the design entities.

26. The at least one computer readable medium of claim 25 wherein the design files comprise a text format.

27. The at least one computer readable medium of claim 17 wherein the computer readable code for simulating the portion of the circuit design comprises computer readable code for applying a stimulus to the netlist.

28. The at least one computer readable medium of claim 27 wherein the stimulus comprises a test vector file and the computer readable code for applying the stimulus employs a test bench corresponding to the test vector file.

29. The at least one computer readable medium of claim 17 wherein the computer readable code for simulating the portion of the circuit design comprises computer readable code for performing a functional simulation using zero delays in the netlist.

30. The at least one computer readable medium of claim 17 wherein the computer readable code for simulating the portion of the circuit design comprises computer readable code for performing a behavioral simulation.

31. The at least one computer readable medium of claim 17 wherein the computer readable code for simulating the portion of the circuit design comprises computer readable code for performing a timing simulation.

32. The at least one computer readable medium of claim 17 wherein the computer readable code for simulating the portion of the circuit design comprises computer readable code for annotating the design files associated with the subset of the design entities with simulation results.

33. The at least one computer readable medium of claim 17 wherein the design files comprise both graphic and text formats.

34. A computer system comprising:
a central processing unit;
a display;
a keyboard;
memory having stored therein program instructions for simulating a portion of a circuit design, the memory comprising:
computer readable code for generating the circuit design comprising a plurality of design files each corresponding to one of a plurality of design entities in the circuit design wherein the plurality of design entities includes fully specified design entities which are sufficiently specified to enable generation of netlists for simulation and partially specified design entities which require further specification for generation of netlists for simulation;
computer readable code for selecting a subset of the design entities from among the fully specified and partially specified design entities in the circuit design, the subset of design entities corresponding to the portion of the circuit design and including at least one of the partially specified design entities;
computer readable code for, in response to selecting the subset of the design entities, generating a netlist under software control directly from selected ones of the design files associated with the subset of the design entities any design file associated with the at least one partially specified design entities being affirmatively excluded from generation of the netlist; and
computer readable code for simulating the portion of the circuit design using the generated netlist.

* * * * *